United States Patent
Clarke et al.

(10) Patent No.: US 12,111,906 B2
(45) Date of Patent: Oct. 8, 2024

(54) GENERATION OF PERSONALIZED DIGITAL IMAGES USING UNENCRYPTED KEYS

(71) Applicant: FMR LLC, Boston, MA (US)

(72) Inventors: Catherine Clarke, Revere, MA (US); Daniel Brown, Boston, MA (US); Tanvi Sehgal, Los Angeles, CA (US); Srishti Saboo, Revere, MA (US); Anne-Marie Tattan, North Andover, MA (US); Tess Wilde, Sherborn, MA (US)

(73) Assignee: FMR LLC, Boston, MA (US)

( * ) Notice: Subject to any disclaimer, the term of this patent is extended or adjusted under 35 U.S.C. 154(b) by 543 days.

(21) Appl. No.: 17/504,318

(22) Filed: Oct. 18, 2021

(65) Prior Publication Data

US 2023/0123682 A1    Apr. 20, 2023

(51) Int. Cl.
| | |
|---|---|
| *H04L 9/06* | (2006.01) |
| *G06F 16/583* | (2019.01) |
| *G06F 21/36* | (2013.01) |
| *G06T 11/00* | (2006.01) |
| *H04L 9/40* | (2022.01) |
| *H04L 29/06* | (2006.01) |

(52) U.S. Cl.
CPC ............ *G06F 21/36* (2013.01); *G06T 11/001* (2013.01); *H04L 9/0643* (2013.01); *H04L 63/083* (2013.01)

(58) Field of Classification Search
CPC ... H04L 63/083; H04L 9/0662; H04L 9/3226; H04L 9/0894; H04L 9/0643; G06T 11/001; G06F 21/36
See application file for complete search history.

(56) References Cited

U.S. PATENT DOCUMENTS

| | | | |
|---|---|---|---|
| 6,005,936 A | 12/1999 | Shimizu et al. | |
| 7,209,571 B2* | 4/2007 | Davis | G06F 21/10 |
| | | | 705/317 |
| 8,355,169 B2 | 1/2013 | Hersch et al. | |
| 8,429,205 B2* | 4/2013 | Rhoads | G06F 16/48 |
| | | | 707/698 |

(Continued)

OTHER PUBLICATIONS

W. Hong et al., "A Color Image Authentication Scheme With Grayscale Invariance," IEEE Access, vol. 9, 6522-6535, Jan. 12, 2021, DOI: 10.1109/ACCESS.2020.3047270, 14 pages.

*Primary Examiner* — Mohammad A Siddiqi
(74) *Attorney, Agent, or Firm* — Cesari & McKenna, LLP (57) ABSTRACT

Methods and apparatuses are described for generating a digital image using an unencrypted key. A server computing device generates an initial digital image comprising a plurality of image areas. The server computing device converts an unencrypted key associated with a remote computing device into an encrypted key using an encryption algorithm. The server computing device assigns a color value to each character of the encrypted key. The server computing device maps each character of the encrypted key to one of the plurality of image areas of the initial digital image. The server computing device generates an updated digital image by applying, to each of the plurality of image areas, a color that corresponds to the color value assigned to the character of the encrypted key that is mapped to the image area. The server computing device stores the updated digital image in a database record.

26 Claims, 8 Drawing Sheets

(56) References Cited

U.S. PATENT DOCUMENTS

| | | | |
|---|---|---|---|
| 9,189,720 B2 | 11/2015 | Smith et al. | |
| 9,514,400 B2 | 12/2016 | Mesh-Iliescu et al. | |
| 10,211,989 B2* | 2/2019 | Pogorelik | H04N 1/32229 |
| 10,212,599 B1* | 2/2019 | Sarthi | H04W 12/084 |
| 10,313,332 B2 | 6/2019 | Hong et al. | |
| 10,366,222 B2* | 7/2019 | Daly | H04W 12/068 |
| 2015/0019440 A1* | 1/2015 | Yang | H04L 9/3226 |
| | | | 705/65 |
| 2019/0208076 A1 | 7/2019 | Berman | |
| 2020/0410736 A1* | 12/2020 | Lu | G06N 3/047 |
| 2022/0109556 A1* | 4/2022 | Takatsuka | H04N 7/183 |
| 2022/0206674 A1* | 6/2022 | Appleton | G06F 16/95 |
| 2022/0222290 A1* | 7/2022 | Mitkar | G06F 16/583 |

* cited by examiner

| Character | Color Value |
|---|---|
| 0 | #F2643B |
| 1 | #F26A2D |
| 2 | #F08721 |
| 3 | #FEBB12 |
| ... | ... |
| A | #FAE39E |
| B | #F0D064 |
| ... | ... |
| y | #F4AB9D |
| z | #F12EDC |

GENERATION OF PERSONALIZED DIGITAL IMAGES USING UNENCRYPTED KEYS

TECHNICAL FIELD

This application relates generally to methods and apparatuses, including computer program products, for generation of personalized digital images using unencrypted keys.

BACKGROUND

Security of authentication credentials is critical to maintaining the integrity of enterprise computing systems and preventing unauthorized access to sensitive information. However, many users still rely on manually-typed passwords in order to authenticate to remote computing systems. Such passwords typically comprise a mixture of uppercase and lowercase letters, numbers, special symbols, and other characters. Often, users select passwords that can be difficult to remember, particularly when different passwords are used to access different computing systems, websites, apps, etc. Furthermore, such passwords are typically not encrypted—so that if these passwords are compromised, they can be easily used to carry out unauthorized transactions.

SUMMARY

Therefore, what is needed are computerized methods and systems that enable the creation of a personalized, memorable digital image that corresponds to an encrypted version of an unencrypted authentication key or credential, such as a password. The techniques described herein advantageously provide for generation of images with visually distinct and identifiable colors that correspond to a user's authentication credential after encryption—thereby allowing users, particularly those who are visual learners, to remember their own personalized digital image (instead of a lengthy and confusing password) and recall the digital image when authenticating to a variety of computing systems. The methods and systems thereby improve the user experience by enabling users to simply select their own image to authenticate, rather than entering a password. Furthermore, the techniques described herein beneficially strengthen the security of authentication credentials through the use of encryption and randomization, to prevent others from gaining unauthorized access to sensitive information.

The invention, in one aspect, features a computer system for generating a digital image using an unencrypted key. The system includes a server computing device with a memory for storing computer-executable instructions and a processor that executes the computer-executable instructions. The server computing device generates an initial digital image comprising a plurality of image areas. The server computing device converts an unencrypted key associated with a remote computing device into an encrypted key using an encryption algorithm. The server computing device assigns a color value to each character of the encrypted key. The server computing device maps each character of the encrypted key to one of the plurality of image areas of the initial digital image. The server computing device generates an updated digital image by applying, to each of the plurality of image areas, a color that corresponds to the color value assigned to the character of the encrypted key that is mapped to the image area. The server computing device stores the updated digital image in a database record.

The invention, in another aspect, features a computerized method of generating a digital image using an unencrypted key. A server computing device generates an initial digital image comprising a plurality of image areas. The server computing device converts an unencrypted key associated with a remote computing device into an encrypted key using an encryption algorithm. The server computing device assigns a color value to each character of the encrypted key. The server computing device maps each character of the encrypted key to one of the plurality of image areas of the initial digital image. The server computing device generates an updated digital image by applying, to each of the plurality of image areas, a color that corresponds to the color value assigned to the character of the encrypted key that is mapped to the image area. The server computing device stores the updated digital image in a database record.

Any of the above aspects can include one or more of the following features. In some embodiments, the unencrypted key comprises a password for authenticating a user of the remote computing device. In some embodiments, the server computing device receives an authentication request from the remote computing device, transmits a plurality of images for display on the remote computing device, the plurality of images including the updated digital image, receives a selection of one of the plurality of images from the remote computing device, and authenticates the remote computing device when the selected image is the updated digital image.

In some embodiments, the unencrypted key comprises an account number associated with an account of a user of the remote computing device. In some embodiments, the server computing device receives an account access request from the remote computing device, transmits a plurality of images for display on the remote computing device, the plurality of images including the updated digital image, receives a selection of one of the plurality of images from the remote computing device, and provides information associated with the account to the remote computing device when the selected image is the updated digital image.

In some embodiments, the unencrypted key comprises a transaction identifier. In some embodiments, the color value comprises a hexadecimal color code, a red-green-blue (RGB) color code, or a hue-saturation-lightness (HSL) color value. In some embodiments, each of the plurality of image areas comprises a shape within the initial digital image. In some embodiments, each of the plurality of image areas comprises a pixel within the initial digital image.

In some embodiments, the encryption algorithm comprises a hash algorithm. In some embodiments, the initial digital image comprises a plurality of sub-images, each sub-image comprising a subset of the plurality of image areas. In some embodiments, the server computing device assigns the color value to each character of the encrypted key using a mapping table. In some embodiments, the server computing device uses a different mapping table for each user, when assigning the color value to each character of the encrypted key.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
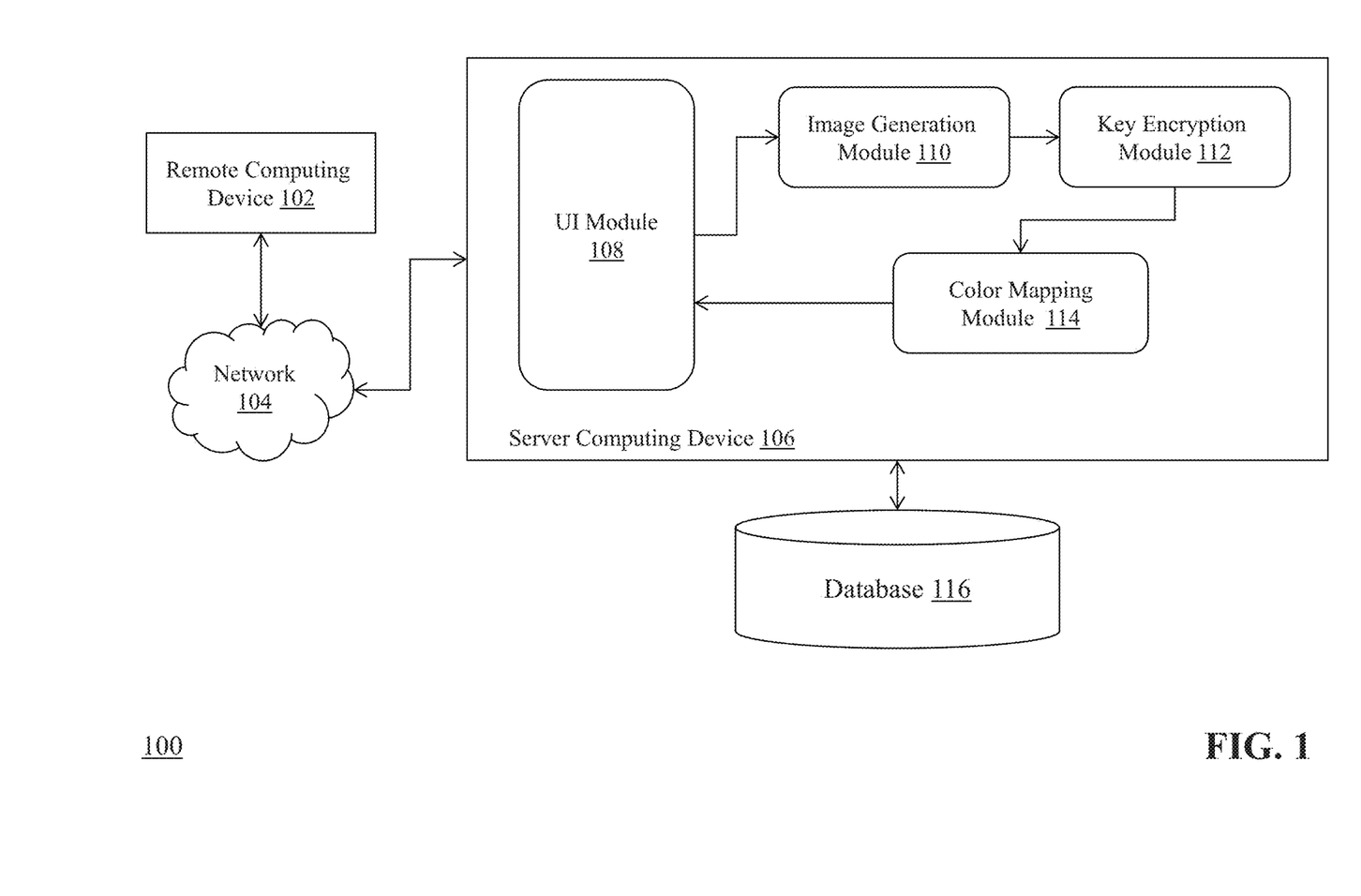
FIG. 1 is a block diagram of a system for generating a digital image using an unencrypted key.

FIG. 1 is a block diagram of a system 100 for generating a digital image using an unencrypted key. The system 100 includes a remote computing device 102, a communications network 104, a server computing device that has a user interface (UI) module 108, an image generation module 110, a key encryption module 112, and a color mapping module 114, and a database 116.

The remote computing device 102 connects to the communications network 104 in order to communicate with the server computing device 106 to provide input and receive output relating to the process of generating a digital image using an unencrypted key as described herein. In some embodiments, the remote computing device 102 is coupled to a display device (not shown). For example, the remote computing device 102 can provide a graphical user interface (GUI) via the display device that presents output resulting from the methods and systems described herein, where a user of the remote computing device 102 interacts with the user interface to request application functionality, provide data input and commands, and the like for the purpose of generating a digital image using an unencrypted key as described herein.

Exemplary remote computing devices 102 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single remote computing device 102, it should be appreciated that the system 100 can include any number of remote computing devices.

The communications network 104 enables the other components of the system 100 to communicate with each other in order to perform the process of generating a digital image using an unencrypted key as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a combination of hardware, including one or more special-purpose processors and one or more physical memory modules, and specialized software modules—such as UI module 108, image generation module 110, key encryption module 112, and color mapping module 114 that execute on the processor of the server computing device 106, to receive data from other components of the system 100, transmit data to other components of the system 100, and perform functions for generating a digital image using an unencrypted key as described herein. In some embodiments, the modules 108 through 114 are specialized sets of computer software instructions programmed onto a dedicated processor in the server computing device 106 and can include specifically-designated memory locations and/or registers for executing the specialized computer software instructions. Further explanation of the specific processing performed by the modules 108 through 114 will be provided throughout the specification.

It should be appreciated that, in some embodiments, the functionality of any or all of the modules 108 through 114 can be programmed on the remote computing device 102 as a 'standalone' digital image generation application for the purposes described herein. For example, in some embodiments the modules 108 through 114 can be packaged into an application that is installed on the remote computing device 102—also called a native application or "app." The native application can be a software application is installed locally on the remote computing device 102 and written with programmatic code designed to interact with an operating system that is native to the remote computing device 102. Such software is available from, e.g., the Apple® App Store or the Google® Play Store. In some embodiments, the native application includes a software development kit (SDK) module that is executed by a processor of the remote computing device 102 to perform functions associated with generating a digital image using an unencrypted key as described herein. The native application can be executed when the remote computing device 102 is online—that is, communicatively coupled to a network, such as the Internet—or offline.

It should be appreciated that, in some embodiments, any or all of the functionality of modules 108 through 114 can be provided by the server computing device 106 via a browser application on the remote computing device 102. A browser typically comprises software executing on a processor of the remote computing device 102 that enables the remote device to communicate via HTTP or HTTPS with the server computing device 106 (e.g., a web server addressable with uniform resource locators (URLs)) to receive website-related content, including one or more webpages that contain user interface content, for rendering in the browser application and presentation on a display device coupled to the remote computing device 102. Exemplary mobile browser application software includes, but is not limited to, Firefox™ Chrome™, Safari™, and other similar software. The one or more webpages can comprise visual and audio content for display to and interaction with a user of the remote device 102.

Although the modules 108 through 114 are shown in FIG. 1 as executing within the same server computing device 106, in some embodiments the functionality of the modules 108 through 114 can be distributed among a plurality of server computing devices. As shown in FIG. 1, the server computing device 106 enables the modules 108 through 114 to communicate with each other, and with database 116, in order to exchange data for the purpose of performing the described functions. It should be appreciated that any number of computing devices, arranged in a variety of architectures, resources, and configurations (e.g., networked computing, cluster computing, virtual computing, cloud computing) can be used without departing from the scope of the technology described herein.

The database 116 is a computing module that is configured to receive, generate, and store specific segments of data relating to the process of generating a digital image using an unencrypted key as described herein. In some embodiments, all or a portion of the database 116 can be integrated with the server computing device 106. In some embodiments (as shown in FIG. 1), the database 116 can be located on a separate computing device or devices, available either local connection or remote connection (e.g., cloud-based services). The database 116 can comprise one or more databases configured to store portions of data used by the other components of the system 100, as will be described in greater detail below. In some embodiments, the database 116 functions as a data repository to store computing files (such as digital image files and/or pointers to such digital image files) in memory and/or on disk. For example, the database 116 can be remote accessed via a LAN/WAN, or the database 116 can be internal to the server computing device 106 and/or remote computing device 102.

Figure 2:
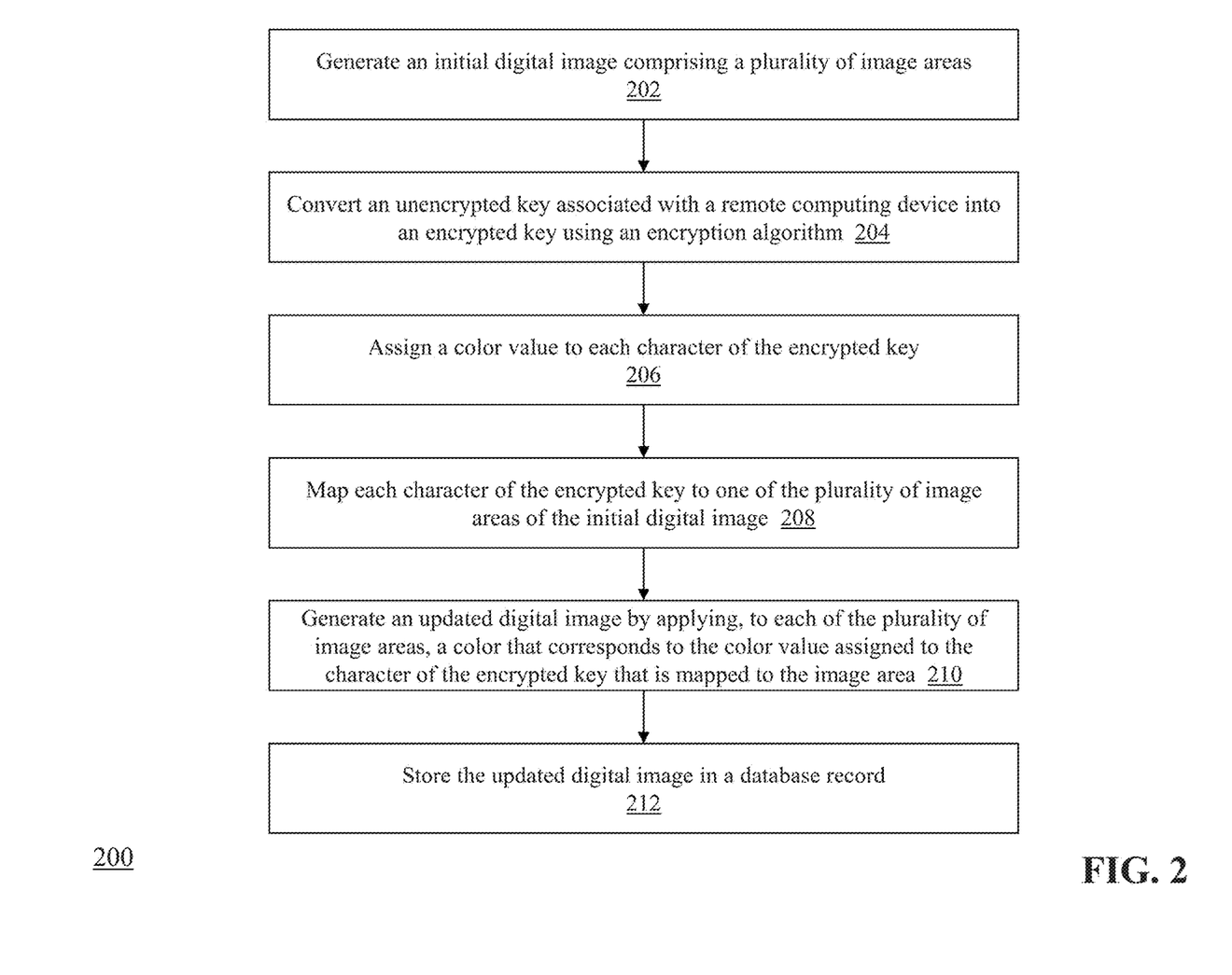
FIG. 2 is a flow diagram of a computerized method of generating a digital image using an unencrypted key.

FIG. 2 is a flow diagram of a computerized method 200 of generating a digital image using an unencrypted key, using the system 100 of FIG. 1. As described above, an exemplary application of the methods and systems described herein is the generation and storage of personalized digital images that are created using an encrypted key associated with the remote computing device 102, where the personalized digital images can then be used to authenticate the remote computing device and/or a user of the remote computing device. For example, a user of remote computing device 102 may want to convert a password, account number, transaction key, or other sensitive information into a unique digital image that is easy for the user to recall in future authentication requests or transactions and also securely protects the associated key/sensitive information.

A user at remote computing device 102 requests a personalized digital image from server computing device 106 by connecting to the UI module 108 of server computing device 106 (via network 104). The UI module 108 generates a user interface for display on the remote computing device that enables the user to submit a request for a personalized digital image. In some embodiments, as part of the request the remote computing device 102 provides an unencrypted key that will be used to generate the personalized digital image. The unencrypted key can take any of a variety of different forms, including but not limited to a password string, an authentication token, a transaction identifier, an account number, or other types of sensitive character-based information. In one example, the user can enter a password into the user interface and transmit the password to the UI module 108 of server computing device 106.

Upon receiving the request for a digital image, the UI module 108 transmits the request (and the unencrypted key) to the image generation module 110. The image generation module 110 generates (step 202 of FIG. 2) an initial digital image (or raw digital image) comprising a plurality of image areas. In some embodiments, the image generation module 110 can generate an initial digital image by retrieving one or more images from database 116. In other embodiments, the image generation module 110 can be configured to create an initial digital image dynamically using, e.g., Scalable Vector Graphics (SVG) to create a two-dimensional XML file that represents the digital image.

Figure 3A:
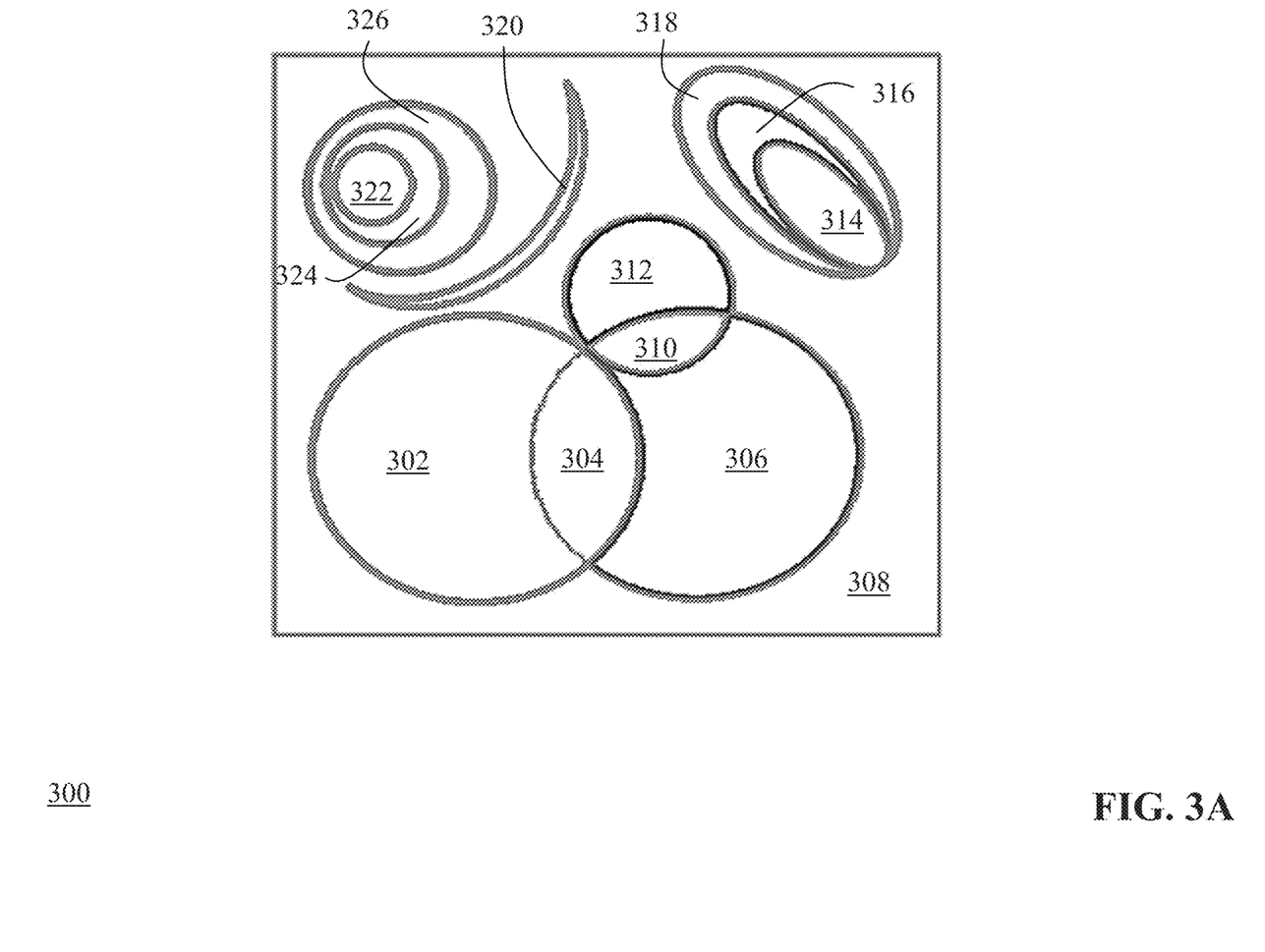
FIG. 3A is a diagram of an exemplary initial digital image.

As can be appreciated, in order to securely encode the unencrypted key in the digital image, a preferable digital image generated by the image generation module 110 comprises a plurality of image areas. FIG. 3A is an exemplary initial digital image 300 generated by the image generation module 110. As shown in FIG. 3A, the initial digital image comprises a plurality of image areas (e.g., areas 302-326) defined by various shapes in the image. The image areas 302-326 are blank or colorless (e.g., the color value associated with each area is empty or null). In some embodiments, the image areas 302-326 in the initial digital image are set to white by default. As can be appreciated, each of these image areas 302-326 can be associated with a different color value as will be explained in greater detail below. In some embodiments, each of the plurality of image areas comprises a group of pixels in the image that are assigned the same color value. In other embodiments, the plurality of image areas each can be defined as an individual pixel in the image.

Figure 3B:
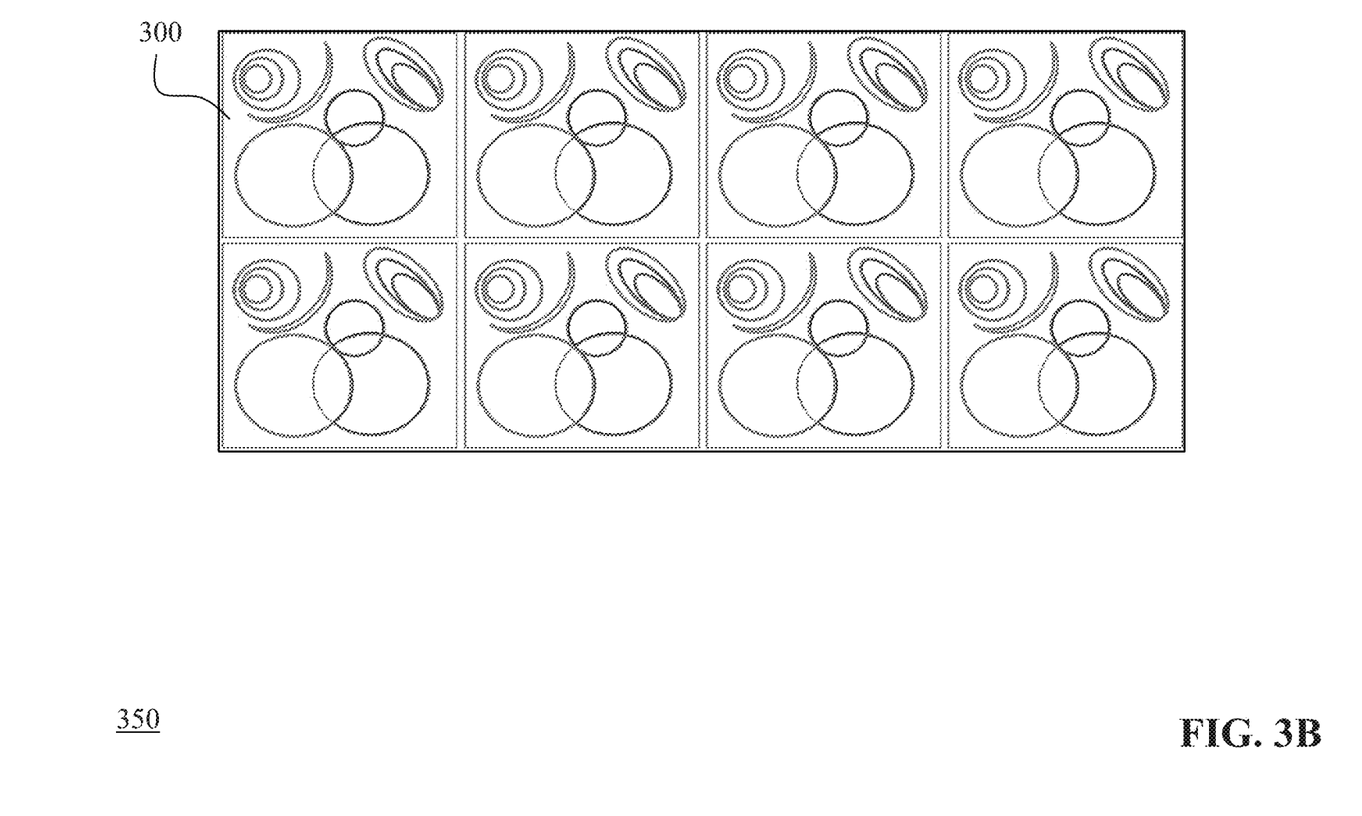
FIG. 3B is a diagram of an exemplary initial digital image comprising a plurality of sub-images.

It should be appreciated that in still other embodiments, the initial digital image can comprise a plurality of sub-images, each comprising a plurality of image areas. FIG. 3B is a diagram of an exemplary initial digital image that includes a plurality of sub-images. As shown in FIG. 3B, the image generation module 110 can generate an initial digital image 350 that includes the same sub-image (e.g., image 300 of FIG. 3A) arranged in a repeated fashion. As will be explained below, in cases where the encrypted key is very long, this type of digital image in FIG. 3B can be useful to ensure that all characters of the encrypted key can be represented in the digital image. Also, the image generation module 110 can repeat the sub-image any number of times to provide enough image areas to capture the complete encrypted key.

Turning back to FIG. 2, the image generation module 110 transmits the initial digital image and the unencrypted key to the key encryption module 112. The key encryption module 112 converts (step 204) the unencrypted key associated with the remote computing device 102 into an encrypted key using an encryption algorithm. As can be appreciated, the encryption algorithm can comprise any of a number of different encryption algorithms that enable an unencrypted value to be obfuscated and/or converted into an encrypted value that cannot be reversed or decoded. In one embodiment, the key encryption module 112 uses a cryptographic hash algorithm to convert the unencrypted key into an encrypted key.

Figure 4:
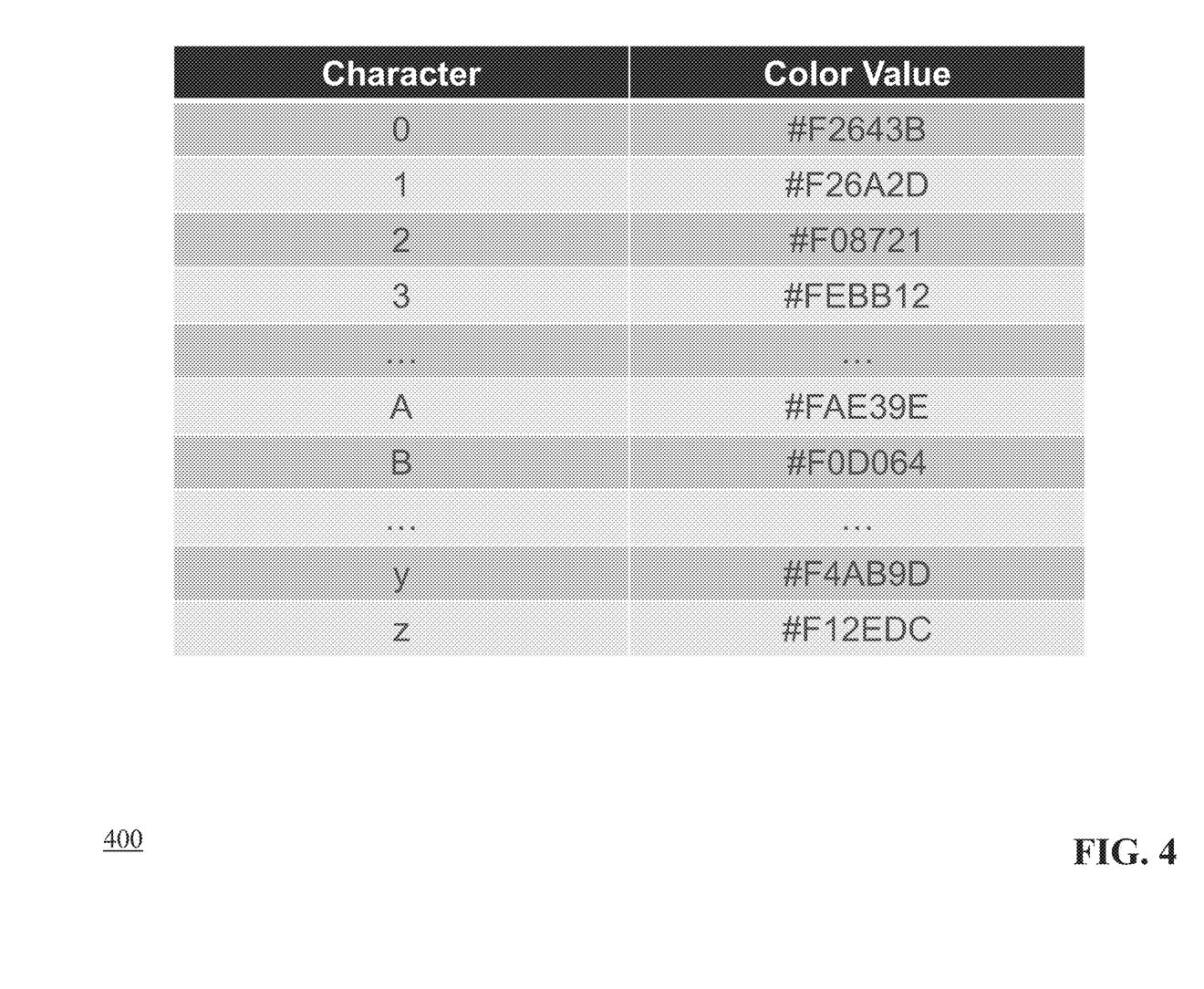
FIG. 4 is a diagram of a portion of an exemplary mapping table.

Once the module 112 generates the encrypted key, the module 112 transmits the initial digital image and the encrypted key to the color mapping module 114. The color mapping module 114 assigns (step 206) a color value to each character of the encrypted key. In some embodiments, the color mapping module 114 retrieves a mapping table from the database 116 and uses the mapping table to assign the color value to each character of the encrypted key. A portion of an exemplary mapping table 400 used by the color mapping module 114 is shown in FIG. 4. In the case where the encrypted key comprises an alphanumeric string, the mapping table is used to identify a color value for each character in the string and assign the color value to the character. As shown in FIG. 4, the color value comprises a hexadecimal color value associated with each possible character (i.e., 0 through 9, A through Z, and a through z). For example, the color value #F2643B is associated with the character zero or '0'). It should be appreciated that the color value can comprise a hexadecimal value, a red-green-blue (RGB) color code, a hue-saturation-lightness (HSL) color value, or other types of color values. The color mapping module 114 traverses the mapping table and for each character in the encrypted key, identifies the color value in the table and assigns the color value to the character (e.g., in a separate table stored in database 116 or in local memory). In some embodiments, the color mapping module 114 can use a different mapping table for each remote computing device 102 and/or user that submits a request for a personalized digital image. In some cases, the color mapping module 114 randomizes the mapping table color values for each different remote computing device 102 and/or user, to ensure that the image generated by the system 100 is personalized and unique to the user.

Figure 5:
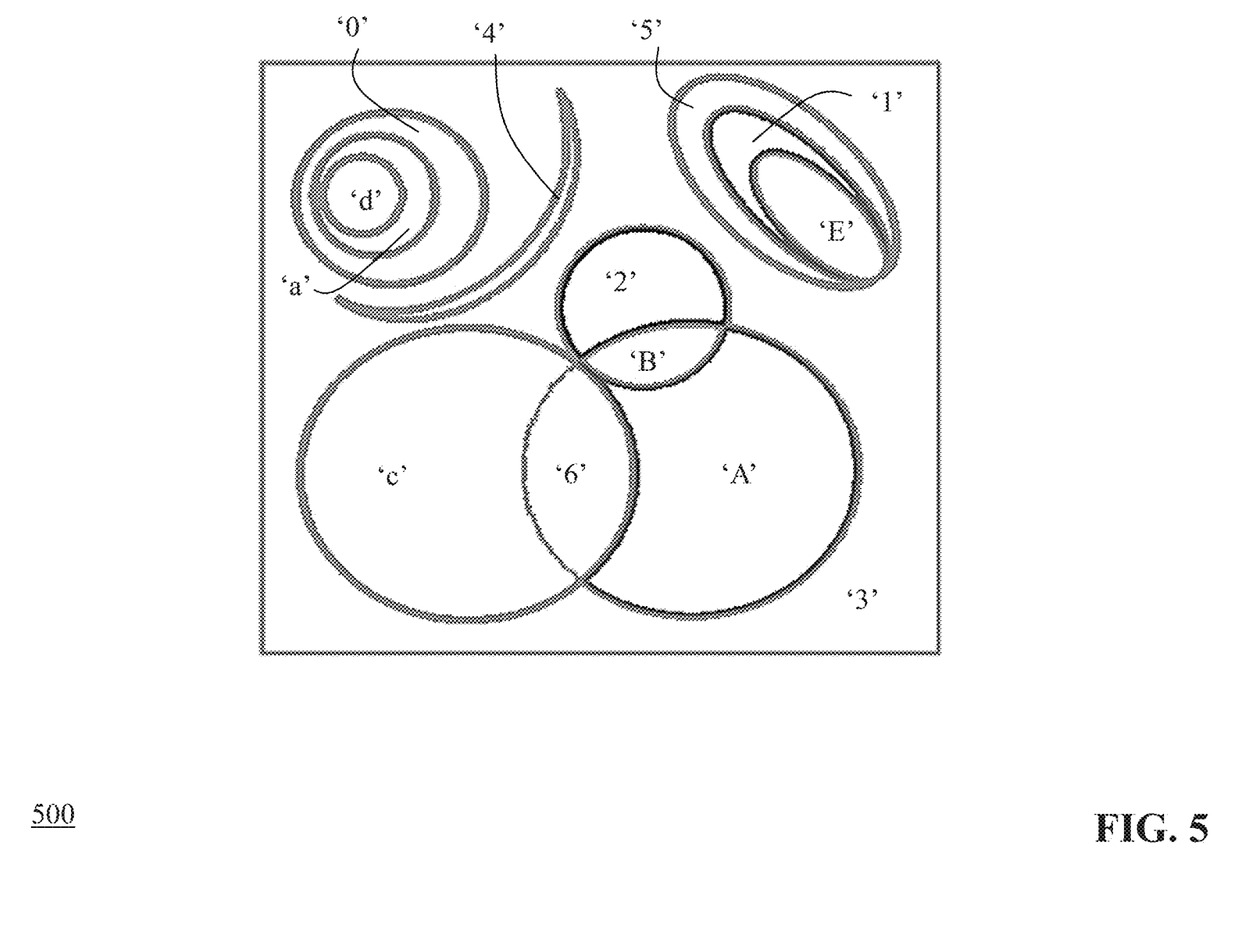
FIG. 5 is a diagram of an exemplary mapping of the encrypted key to the initial digital image.

After mapping the characters in the encrypted key to a color value, the color mapping module 114 maps (step 208) each character of the encrypted key to one of the plurality of image areas of the initial digital image. For example, the encrypted key can be: 0ad451E2Bc6A3. FIG. 5 is an exemplary mapping 500 of the encrypted key to the initial digital image. As shown in FIG. 5, each character of the above example encrypted key is mapped to a different area of the plurality of image areas. In this example, the color mapping module 114 traversed the initial digital image from top to bottom and from left to right, detecting each area of image (e.g., using an edge detection algorithm or using the shape definitions in the SVG XML file), selecting each character in the encrypted key from left to right, and mapping the character to the detected area. In some embodiments, the mapping of the key character to the image area is stored in database 116.

Figure 6:
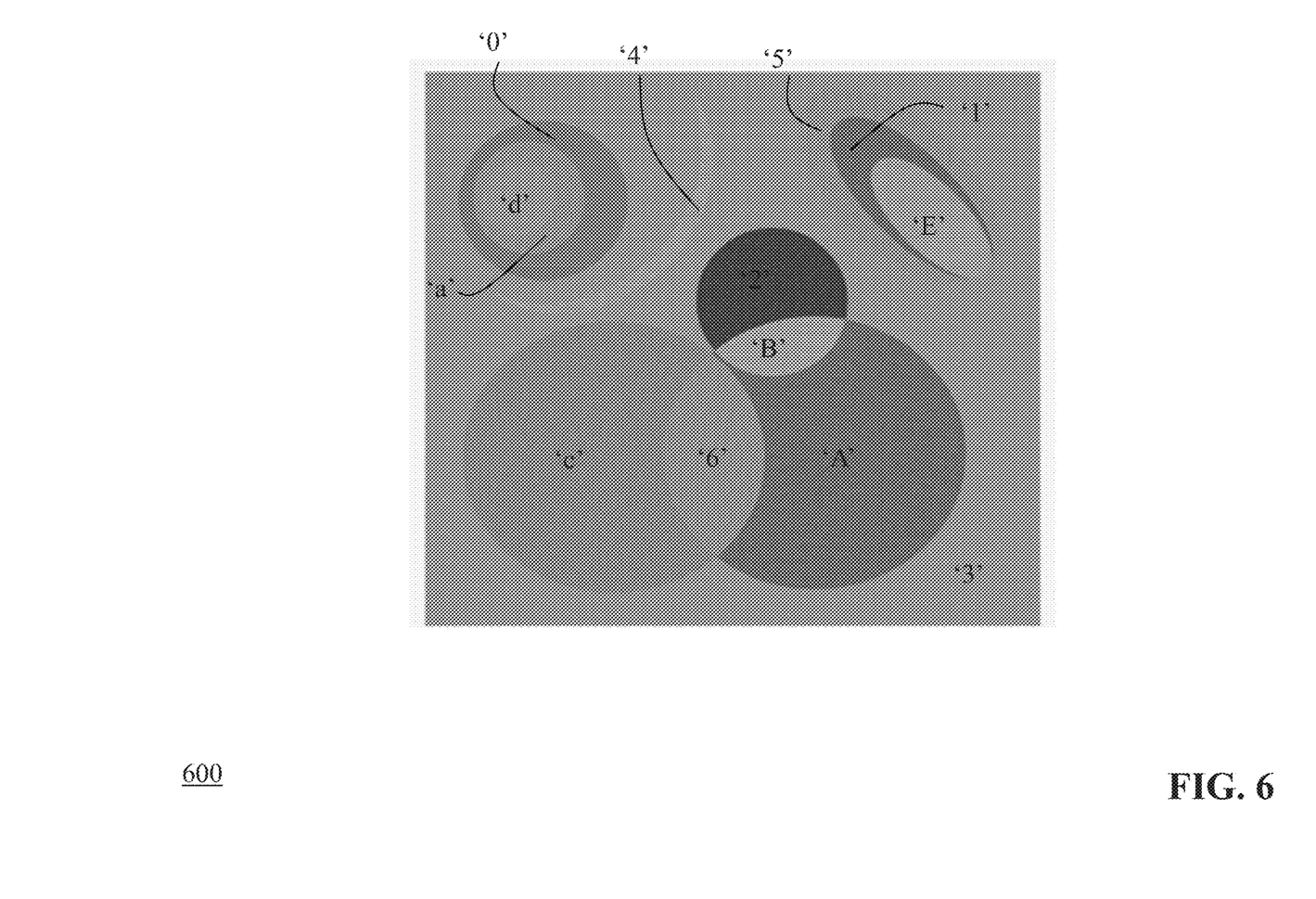
FIG. 6 is a diagram of an exemplary updated digital image showing the color values applied to each of the image areas along with the character of the key.

Then, the color mapping module 114 generates (step 210) an updated digital image by applying, to each of the plurality of image areas, a color that corresponds to the color value assigned to the character of the encrypted key that is mapped to the image area. For example, the color mapping module 114 can update the SVG XML file to incorporate the color values from the mapping table of FIG. 4 into the XML file for each of the areas. FIG. 6 is an exemplary updated digital image 600 showing the color values applied to each of the image areas along with the character of the key. Although the image in FIG. 6 is in grayscale due to limitations on color drawings in patent applications, it should be appreciated that in a typical embodiment, the color values correspond to a wide array of different hues in any color. Also, the character values from the encrypted key are shown for reference purposes in FIG. 6, but it should be appreciated that the updated digital image does not display these key values to a viewer of the image. In some embodiments, the color mapping module can use the D3.js library (available from d3js.org) to generate the updated digital image.

Once the color mapping module 114 has applied the colors to the digital image, the color mapping module 114 stores (step 214) the updated digital image in a database record in database 116. For example, the color mapping module 114 can store the updated digital image in a profile associated with the remote computing device 102 and/or user of the remote computing device 102 for later retrieval. For example, when the user of remote computing device 102 submits an authentication request, the server computing device 106 can identify the user (e.g., based upon a username or device identifier) and retrieve the updated digital image for display on the remote computing device 102 via UI module 108. In some embodiments, the server computing device 106 can display the updated digital image on the remote device along with a plurality of other images that are not associated with the remote device. When the user selects the updated digital image, the UI module 108 can grant access to the requested functionality. If the user selects an incorrect image (either once or more than once), the UI module 108 can restrict access to the requested functionality.

Figure 7:
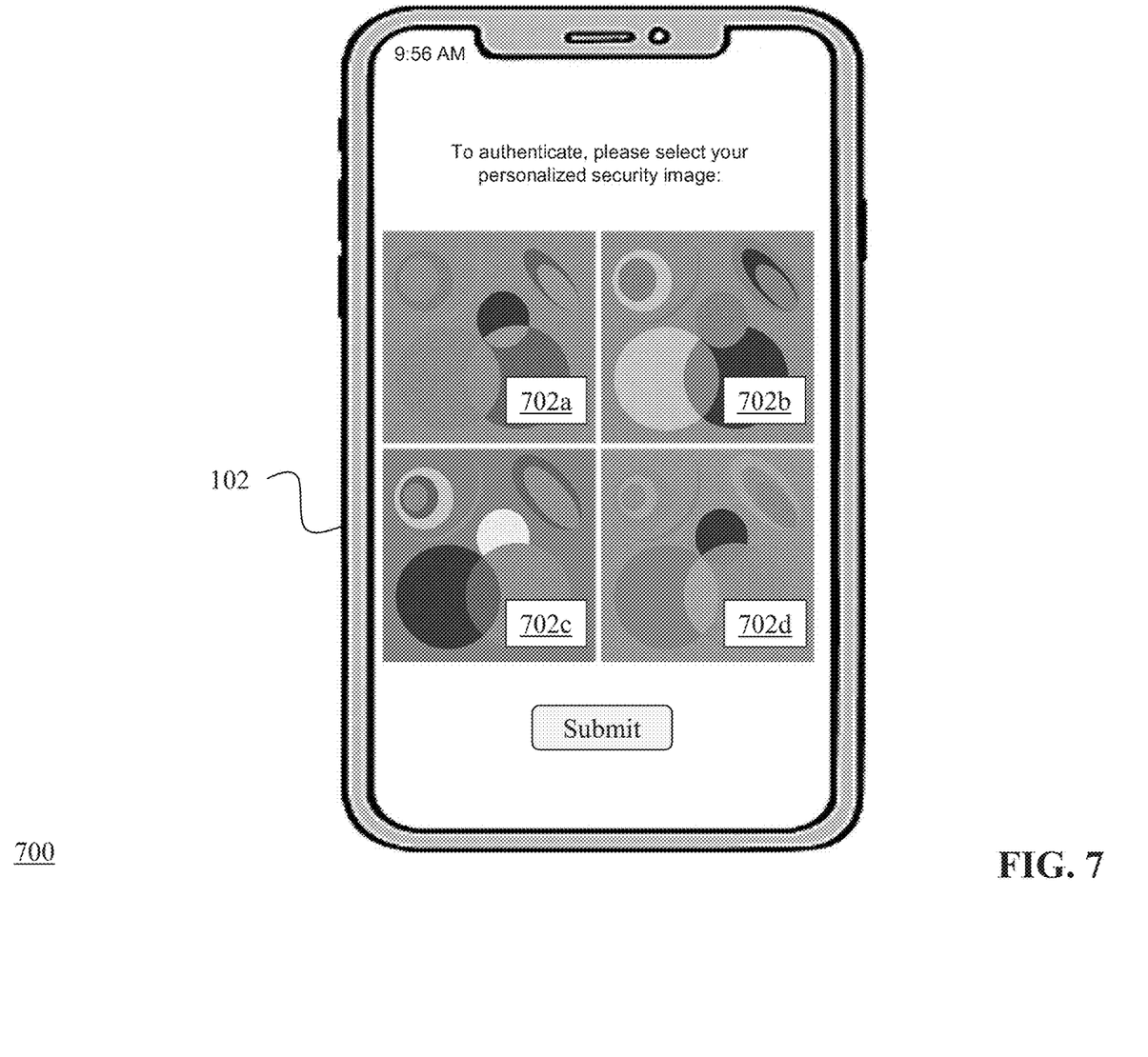
FIG. 7 is a diagram of an exemplary user interface for authentication using the personalized digital image generated by the system.

FIG. 7 is a diagram of an exemplary user interface 700 for authentication using the personalized digital image generated by the system 100. As shown in FIG. 7, the user interface 700 includes a plurality of digital images—including the updated digital image 702a along with three other digital images (702b, 702c, 702d) that are similar to the updated digital image but use different color schemes. The user of remote computing device 102 must identify his or her personalized digital image in order to complete the authentication process.

It should be appreciated that the above-described techniques can be used in a variety of different authentication applications. For example, as described herein, the unencrypted key provided from the remote computing device 102 can be a password. In other embodiments, the unencrypted key can be an account number (e.g., bank account, credit card number) that is used to generate the personalized digital image so that the user, instead of trying to remember a lengthy sequence of digits, can simply identify a personalized digital image that is easy to visualize and recall. In yet another embodiment, the unencrypted key can be a transaction identifier (e.g., blockchain transaction ID) that can be converted into a customized digital image to individually represent the transaction in a more unique way.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the technology described herein by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer system for generating a digital image using an unencrypted key, the system comprising a server computing device with a memory for storing computer-executable instructions and a processor that executes the computer-executable instructions to:
   generate an initial digital image comprising a plurality of image areas;
   convert an unencrypted key associated with a remote computing device into an encrypted key using an encryption algorithm;
   assign a color value to each character of the encrypted key;
   map each character of the encrypted key to one of the plurality of image areas of the initial digital image;
   generate an updated digital image by applying, to each of the plurality of image areas, a color that corresponds to the color value assigned to the character of the encrypted key that is mapped to the image area; and
   store the updated digital image in a database record.

2. The system of claim 1, wherein the unencrypted key comprises a password for authenticating a user of the remote computing device.

3. The system of claim 2, wherein the server computing device is further configured to:

receive an authentication request from the remote computing device;
transmit a plurality of images for display on the remote computing device, the plurality of images including the updated digital image;
receive a selection of one of the plurality of images from the remote computing device; and
authenticate the remote computing device when the selected image is the updated digital image.

4. The system of claim 1, wherein the unencrypted key comprises an account number associated with an account of a user of the remote computing device.

5. The system of claim 4, wherein the server computing device is further configured to:
receive an account access request from the remote computing device;
transmit a plurality of images for display on the remote computing device, the plurality of images including the updated digital image;
receive a selection of one of the plurality of images from the remote computing device; and
provide information associated with the account to the remote computing device when the selected image is the updated digital image.

6. The system of claim 1, wherein the unencrypted key comprises a transaction identifier.

7. The system of claim 1, wherein the color value comprises a hexadecimal color code, a red-green-blue (RGB) color code, or a hue-saturation-lightness (HSL) color value.

8. The system of claim 1, wherein each of the plurality of image areas comprises a shape within the initial digital image.

9. The system of claim 1, wherein each of the plurality of image areas comprises a pixel within the initial digital image.

10. The system of claim 1, wherein the encryption algorithm comprises a hash algorithm.

11. The system of claim 1, wherein the initial digital image comprises a plurality of sub-images, each sub-image comprising a subset of the plurality of image areas.

12. The system of claim 1, wherein the server computing device assigns the color value to each character of the encrypted key using a mapping table.

13. The system of claim 12, wherein the server computing device uses a different mapping table for each user, when assigning the color value to each character of the encrypted key.

14. A computerized method of generating a digital image using an unencrypted key, the method comprising:
generating, by a server computing device, an initial digital image comprising a plurality of image areas;
converting, by the server computing device, an unencrypted key associated with a remote computing device into an encrypted key using an encryption algorithm;
assigning, by the server computing device, a color value to each character of the encrypted key;
mapping, by the server computing device, each character of the encrypted key to one of the plurality of image areas of the initial digital image;
generating, by the server computing device, an updated digital image by applying, to each of the plurality of image areas, a color that corresponds to the color value assigned to the character of the encrypted key that is mapped to the image area; and
storing, by the server computing device, the updated digital image in a database record.

15. The method of claim 14, wherein the unencrypted key comprises a password for authenticating a user of the remote computing device.

16. The method of claim 14, further comprising:
receiving, by the server computing device, an authentication request from the remote computing device;
transmitting, by the server computing device, a plurality of images for display on the remote computing device, the plurality of images including the updated digital image;
receiving, by the server computing device, a selection of one of the plurality of images from the remote computing device; and
authenticating, by the server computing device, the remote computing device when the selected image is the updated digital image.

17. The method of claim 14, wherein the unencrypted key comprises an account number associated with an account of a user of the remote computing device.

18. The method of claim 17, further comprising:
receiving, by the server computing device, an account access request from the remote computing device;
transmitting, by the server computing device, a plurality of images for display on the remote computing device, the plurality of images including the updated digital image;
receiving, by the server computing device, a selection of one of the plurality of images from the remote computing device; and
providing, by the server computing device, information associated with the account to the remote computing device when the selected image is the updated digital image.

19. The method of claim 14, wherein the unencrypted key comprises a transaction identifier.

20. The method of claim 14, wherein the color value comprises a hexadecimal color code, a red-green-blue (RGB) color code, or a hue-saturation-lightness (HSL) color value.

21. The method of claim 14, wherein each of the plurality of image areas comprises a shape within the initial digital image.

22. The method of claim 14, wherein each of the plurality of image areas comprises a pixel within the initial digital image.

23. The method of claim 14, wherein the encryption algorithm comprises a hash algorithm.

24. The method of claim 14, wherein the initial digital image comprises a plurality of sub-images, each sub-image comprising a subset of the plurality of image areas.

25. The method of claim 14, wherein the server computing device assigns the color value to each character of the encrypted key using a mapping table.

26. The method of claim 25, wherein the server computing device uses a different mapping table for each user, when assigning the color value to each character of the encrypted key.

* * * * *